United States Patent [19]

Ishimaru et al.

[11] Patent Number: 5,005,326
[45] Date of Patent: Apr. 9, 1991

[54] STRUCTURE VIBRATION PROOFING OR SUPPRESSING SYSTEM WITH DIFFERENTIAL DOUBLE LEVER MECHANISM

[76] Inventors: Shinji Ishimaru, 11-17, Hanaguri 4, Sohka-shi, Saitama-ken; Takahiro Niiya, 872, Hazama 2-chome, Funabashi-shi, Chiba-ken; Kazuko Ishimaru, 11-17, Hanaguri 4, Sohka-shi, Saitama-ken, all of Japan

[21] Appl. No.: 470,206

[22] Filed: Jan. 25, 1990

[30] Foreign Application Priority Data

Feb. 15, 1989 [JP] Japan .................................. 1-35781

[51] Int. Cl.⁵ .......................... E04B 1/98; E04H 9/02
[52] U.S. Cl. .......................... 52/167 R; 52/167 DF; 52/1; 248/562; 248/580
[58] Field of Search ....... 52/167 R, 167 CB, 167 DF, 52/1; 248/562, 580–581, 584, 593, 595, 648

[56] References Cited

U.S. PATENT DOCUMENTS

| | | | |
|---|---|---|---|
| 3,865,340 | 2/1975 | Ellis | 248/562 |
| 3,940,895 | 3/1976 | Yamamoto et al. | 52/292 X |
| 4,033,566 | 7/1977 | Petersen | 52/167 DF |
| 4,328,648 | 5/1982 | Kalpins | 52/167 R |
| 4,562,673 | 1/1986 | Barari | 52/167 R |
| 4,565,039 | 1/1986 | Oguro et al. | 52/167 R |
| 4,574,540 | 3/1986 | Shiau | 52/167 R |
| 4,596,373 | 6/1986 | Omi et al. | 248/562 |
| 4,615,157 | 10/1986 | Murray | 52/167 R |
| 4,801,122 | 1/1989 | Stahl | 52/167 R |
| 4,881,350 | 11/1989 | Wu | 52/167 R |

FOREIGN PATENT DOCUMENTS

| | | | |
|---|---|---|---|
| 798556 | 5/1936 | France | 248/584 |
| 73641 | 4/1984 | Japan | 248/584 |
| 637491 | 12/1978 | U.S.S.R. | 52/167 |

*Primary Examiner*—Richard E. Chilcot, Jr.
*Assistant Examiner*—Deborah McGann Ripley

[57] ABSTRACT

A vibration proofing/suppressing system including a first rigid member extending and translatable in a first direction, a second rigid member extending parallel to the first rigid member and translatable in the first direction relative to the first member, a third rigid member interposed between the first and second rigid member, and a fourth member interposed between the first and second rigid members. Guide means are interposed between the first and third and fourth members and the second and third and fourth members for guiding translation of the third and fourth members along the direction of relative movement between the first and second members. At least one first lever means connects the first member to the fourth member, the at least one first lever means being pivotally connected to a first point on the third member such that the at least one first lever means is swingable about the first point. At least one second lever means having a slightly different lever ratio than the at least one first lever means connects the second rigid member to the fourth member, the at least one second lever means being pivotally connected to a second point on the third member such that the at least one second lever means is swingable about the second point.

8 Claims, 17 Drawing Sheets

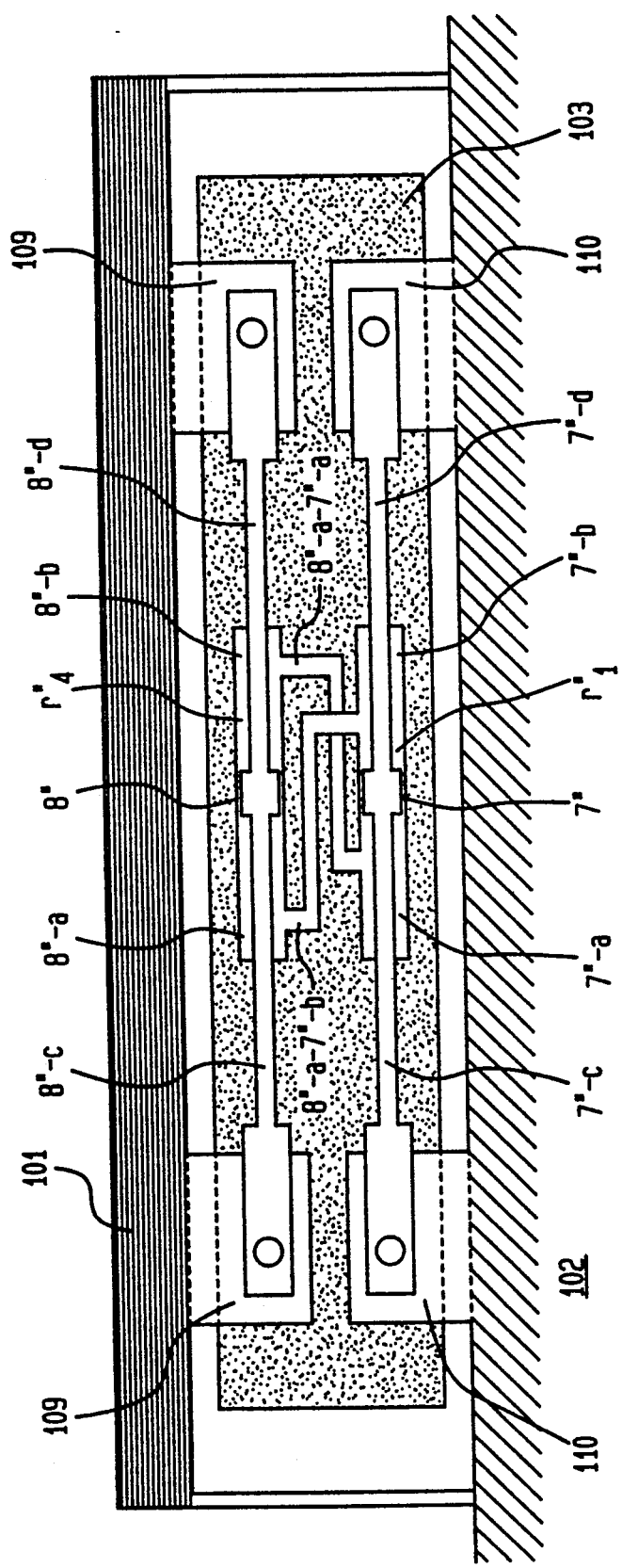

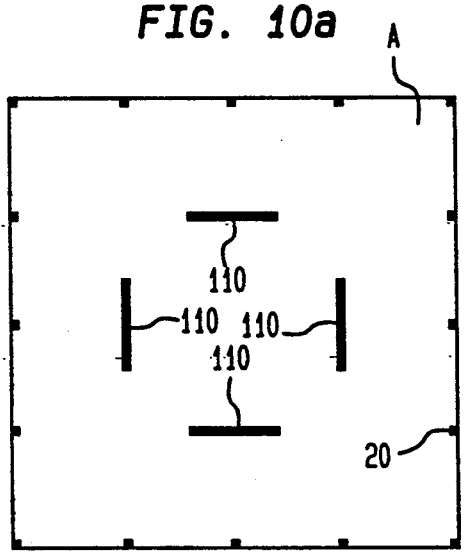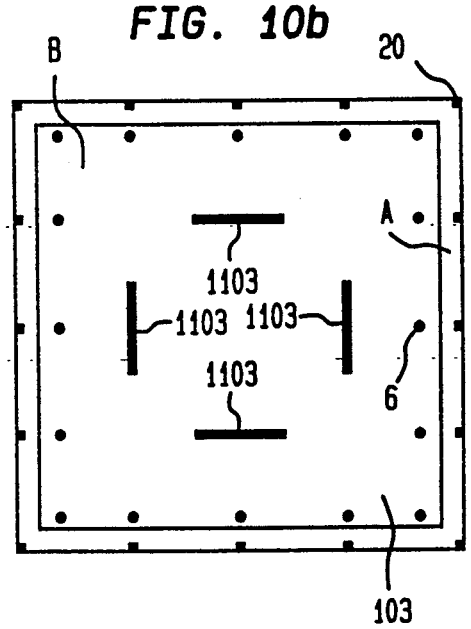

STRUCTURE VIBRATION PROOFING OR SUPPRESSING SYSTEM WITH DIFFERENTIAL DOUBLE LEVER MECHANISM

The present application is related to a copending application in the name of Ishimaru entitled "Vibration Proofing or Suppressing System for a Multi-storied Structure Subjected to Earthquakes or the like" to be filed on or about the date the present application is filed.

BACKGROUND OF THE INVENTION

1. Field of the Invention

The present invention relates to a vibration proofing or suppressing system for suppressing the vibration of a civil or building structure under a disturbance such as an earthquake, wind or traffic vibration.

2. The Prior Art

A conventional system for suppressing the vibration of a structure through the utilization of a lever mechanism was disclosed in the Japanese Patent Laid-open No. 38340/75. Another conventional system of such a kind was developed by the present inventors through the improvement of the former system.

In the former conventional system, one end of an arm is provided with a weight as an auxiliary mass and the other end of the arm is pivotally coupled as a fulcrum to either a floorboard or the ceiling of a structure, while a wall with high rigidity is connected to the other floorboard. The intermediate point of the arm and the tip of the wall are coupled to each other by a link. The lever-ratio namely, the ratio of length from the fulcrum of the arm to the weight to the length from the fulcrum to the linkcoupled point of the arm, is made so large that a high counteracting force to suppress the vibration of the structure is generated by the movement of the weight although the weight is light.

In the latter conventional system, one end of a rocking arm is provided as a fulcrum to either a floorboard or the ceiling of a structure. The auxiliary mass is provided so that it can be moved in a horizontal straight direction along a straight movement guide unit. A structural member fixed to the other floorboard is connected through a link to a intermediate point of the rocking arm, and the auxiliary mass is also coupled through another link to the other end of the arm opposite to the fulcrum so that they are moved in conjunction with each other in which the ratio of the lengths of the two links is designed to be same as the lever-ratio of the rocking arm. This results in eliminating the drawbacks of the former conventional system, that is, if the length of lever is long, the reduction of the rigidity of the lever means causes higher modes of vibration, and if the length of the lever means is shortened to produce the high rigidity thereof, the auxiliary mass is moved along an arc by the swing of the lever means, whose behavior causes not only horizontal force required to suppress the vibration of the structure but also vertical force, which makes it difficult to suppress the vibration.

If a structure is multi-storied, systems can be obtained by modifying the latter conventional mechanism so as to be housed in the wall-like members which are provided in the stories of the structure to suppress the vibration thereof.

Furthermore, the present inventors developed the lever means system with the specified distribution of lever-ratios along the height of a multi-storied structure, the distribution of which are determined by making use of the function normalized by the participation factor of the selected mode of vibration, in which the masses, auxiliary masses and stiffnesses of springs are adjusted in order to make the selected eigen vector similar to the index vector of disturbance magnitude of an equation of motion for the whole structure, and thereby enhancing the vibration proofing and suppressing effect of the system.

If auxiliary masses are small for either a structure of ordinary height or a skyscraper, very large lever-ratios such as 50 and 80 are required even for the improved conventional system. However, it is very difficult to design members to meet the requirement. This is one disadvantage of the prior art systems.

Prior art technology is not known which provides a lever system with high damping capacity for structural members such as beams, pillars and piles or for an observatory, a bridge of large span or the like. This is another disadvantage of the prior art.

SUMMARY OF THE INVENTION

The present invention was made in order to solve these disadvantages. Accordingly, it is an object of the present invention to provide a lever mechanism having a very large lever-ratio without making the rigidity thereof low, to enable a structure to have a large earthquake input reducing function and a vibration damping function.

In accordance with the present invention, a vibration proofing or suppressing system is provided for a structure, Still other objects, features and attendant advantages of the present invention will become apparent to those skilled in the art from a reading of the following detailed description of the embodiments constructed in accordance therewith, taken in conjunction with the accompanying drawings.

BRIEF DESCRIPTION OF THE DRAWINGS

The invention of the present application will now be described in more detail with reference to the preferred embodiments of the device, given only by way of example, and with reference to the accompanying drawings, in which:

FIG. 9 shows the basic concept of a vibration proofing system having a differential double lever mechanism obtained by simplifying that shown in FIG. 8.

FIG. 10a is a plan view of an odd-numbered story of a multi-storied structure.

FIG. 10b is a plan view of an even-numbered story of the multi-storied structure.

DETAILED DESCRIPTION OF THE PREFERRED EMBODIMENT

Figure 1:
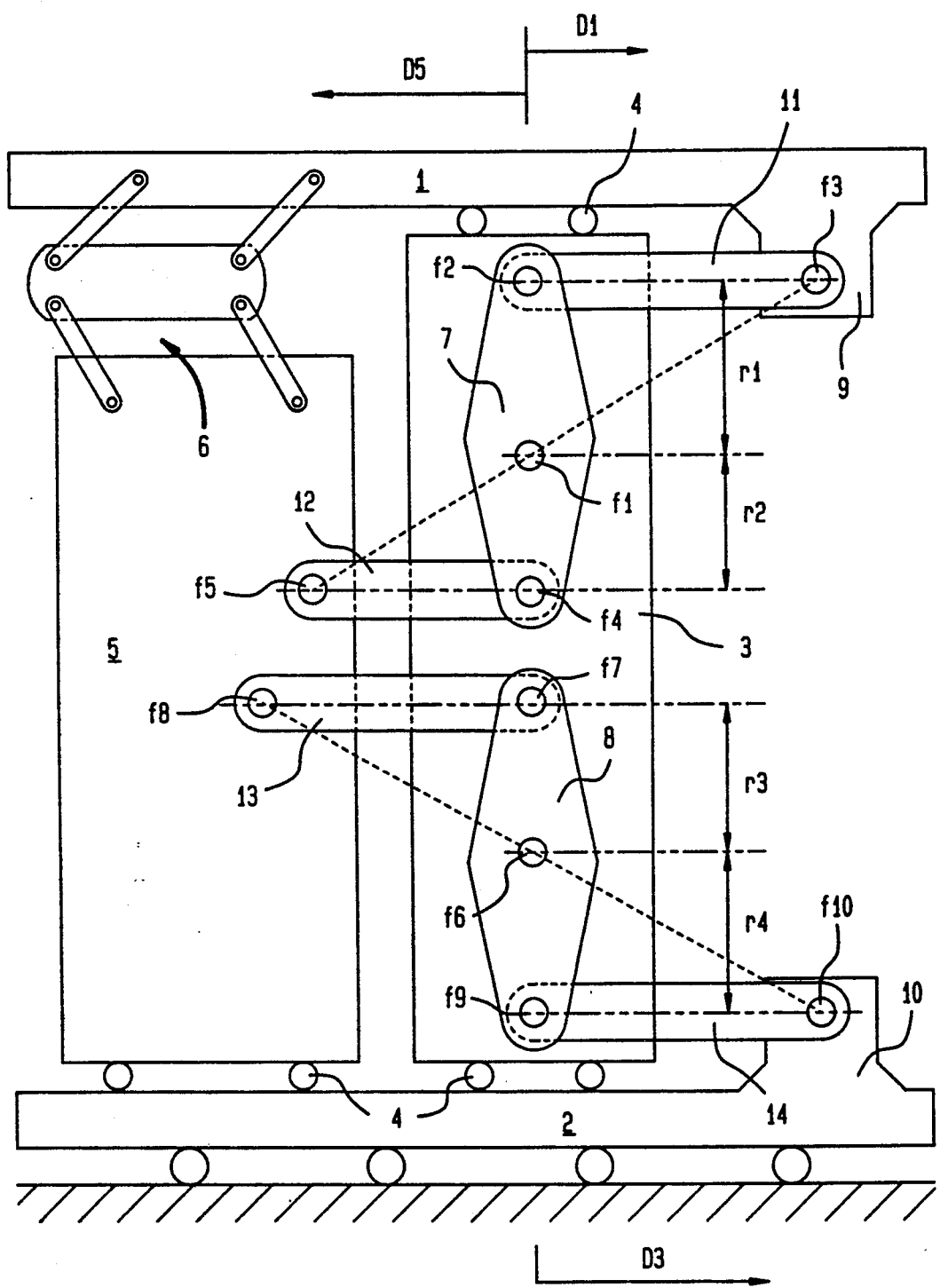
FIG. 1 shows the basic concept of a first structure vibration proofing or suppressing system having a differential double lever mechanism provided in accordance with the present invention, through the utilization of mechanical lever means.

Shown in the drawings are rigid members 1, 2, 3 and 5, rollers 4, a straight guide 4', a joint 5', a pantograph unit 6, lever means 7 and 8, portions fixed to rigid members 9 and 10, pillars 20, a viscous damper 21, a control actuator 22, chord members 40 and 40', a floorboard of ceiling 101, a floorboard 102, auxiliary masses 103, 103' and 105, a rigid portion fixed to an auxiliary mass 1103, rigid parts fixed to floorboards 109 and 110.

Figure 3:
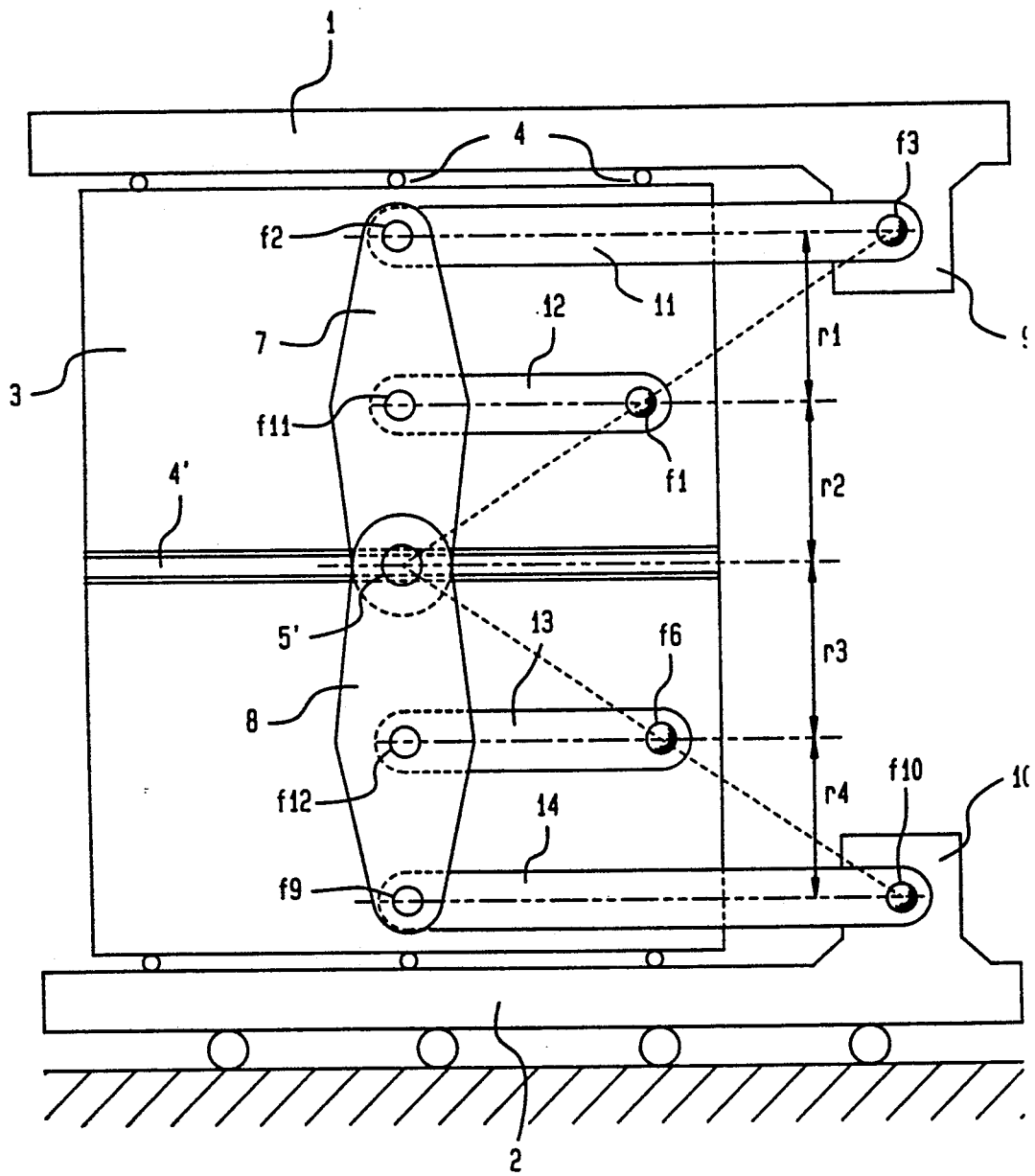
FIG. 3 shows the basic concept of another modification of the system.

Through the utilization of mechanical lever means, FIG. 1 shows the basic concept of a differential double lever mechanism which is a first vibration proofing or suppressing system provided in accordance with the present invention. A plate-like or wall-like rigid member 3 and a plate-like or wall-like rigid member 5 or joint 5' (which is obtained by condensing the member 5, as shown in FIG. 3) are interposed between rigid members 1 and 2 (which are able to move while by maintaining their parallel positions in a certain direction) together with a straight movement guide unit such as rollers 4 and a straight guide 4' and/or a parallel maintenance unit such as a pantograph unit 6, so that the members 3 and 5 or joint 5' can be moved in the direction of the relative movement between the members 1 and 2. The member 1 or solid portion 9 (which is fixed to the member 1) is coupled to member 5 or joint 5' by at least one first fluid or mechanical lever means 7 which is pivotally coupled to at any point on the member 3, so that the means can be swung around the point. The member 2 or solid portion 10 (which is fixed to the member 2) is coupled to member 5 or the joint 5' by at least one second fluid or mechanical lever means 8 which is slightly different in lever-ratio from the first lever means 7 and is pivotally coupled to another arbitrary point of the member 3 so that the second lever means 8 can be swung around the point.

In order to eliminate the influence of the arc-shaped movement caused by the swing of the first lever means 7, such means 7 is pivotally coupled to the point $f_1$ of the rigid member 3. One end $f_2$ of the first lever means and a point $f_3$ of the rigid member 1 or the portion 9 are coupled to each other by a first link 11, and the other end $f_4$ of the first lever means 7 and a point $f_5$ of the rigid member 5 are coupled to each other by a second link 12 extending in parallel with the first link. The ratio of the length $r_1$ between the points $f_1$ and $f_2$ of the first lever means 7 to the length $r_2$ between the points $f_1$ and $f_4$, is predetermined so as to be equal to the ratio of the length between the points $f_3$ and $f_2$ of the first link 11 to the length between the points $f_4$ and $f_5$ of the second link 12.

In order to eliminate influence of the arc-shaped movement caused by swing of second lever means 8, the means 8 is pivotally coupled to the point $f_6$ of the rigid member 3; a point $f_8$ of the rigid member 5 and one end $f_7$ of the lever means are coupled to each other by a third link 13, and the other end $f_9$ of the lever means and a point $f_{10}$ of the rigid member 2 or the portion 10 are coupled to each other by a fourth link 14 extending in parallel with the third link. The ratio of the length $r_3$ between the points $f_6$ and $f_7$ of the second lever means 8, to the length $r_4$ between the points $f_6$ and $f_9$, is predetermined so as to be equal to the ratio of the length between the points $f_7$ and $f_8$ of the third link 13, to the length between the points $f_9$ and $f_{10}$ of the fourth link 14.

Arrow D1 is the displacement X1 of rigid member 1 from rigid member 3. Arrow D3 is the displacement X3 of rigid member 2 from rigid member 3. Arrow D5 is the displacement X5 of rigid member 5 from rigid member 3. These displacements will be discussed in more detail below.

Figure 2:
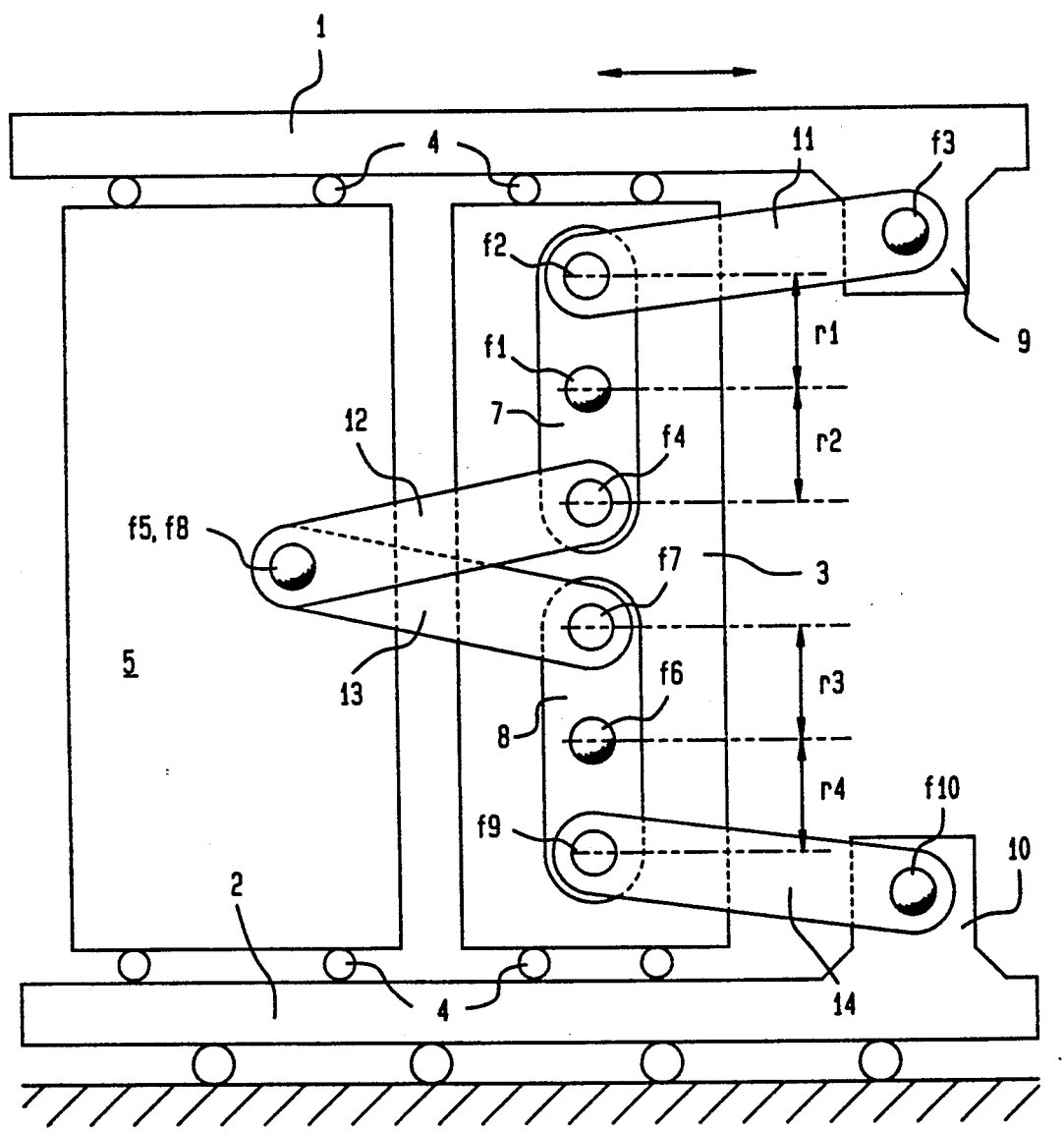
FIG. 2 shows the basic concept of a modification of the system.

FIG. 2 shows the basic concept of a differential double lever mechanism in which the two coupling points $f_5$ and $f_8$ of the rigid member 5 of the lever mechanism shown in FIG. 1 are located at the same point (f5, f8). In order to eliminate the influence of arcshaped movement caused by the swing of the lever means of the mechanism shown in FIG. 2, the first and second links 11 and 12 are disposed in parallel with each other, and the third link 13 is disposed in parallel with the fourth link 14.

FIG. 3 shows the basic concept of a differential double lever mechanism obtained by condensing the rigid member 5 of the lever mechanism shown in FIG. 1, to the joint 5'. In the lever mechanism shown in FIG. 3, one end of a first lever means 7 and one end of a second lever means 8 are coupled to each other at the joint 5' so that the lever means can be swung around the joint. The joint 5' is movable on a straight guide 4' secured to a rigid member 3 so that the guide 4' extends in parallel with the direction of the relative movement between rigid members 1 and 2. The other end $f_2$ of the first lever means 7 and one end $f_3$ of the rigid member 1 or a portion 9, which is fixed thereto, are coupled to each other by a first link 11. A point $f_{11}$ of the first lever means 7 at the intermediate point thereof is coupled to one end of a second link 12 extending in parallel with the first link 11, and pivotally coupled at the other end $f_1$ of the second link to a point on the rigid member 3. The other end $f_9$ of the second lever means 8 and a point $f_{10}$ of the rigid member 2 or a portion 10, which is fixed thereto, are coupled to each other by a fourth link 14 extending in parallel with the third link 13. The ratio of the length $r_1$ between the points $f_{11}$ and $f_2$ of the first lever means 7, to the sum of the lengths $r_1$ and $r_2$ between the joint 5' and the point $f_{11}$ is predetermined so as to be equal to the ratio of the length between the points of $f_{11}$ and $f_1$ of second link 12, to the length between the points of $f_2$ and $f_3$ of first link 11. The ratio of the length $r_3$ between the joint 5' and the point $f_{12}$ of the second lever means 8, to the sum of the lengths $r_3$ and $r_4$ between the point $f_{12}$ and $f_9$ of the second lever means is predetermined so as to be equal to the ratio of the length between the points $f_{12}$ and $f_6$ of the third link 13, to the length between the points of $f_9$ and $f_{10}$ of the fourth link 14.

Figure 4:
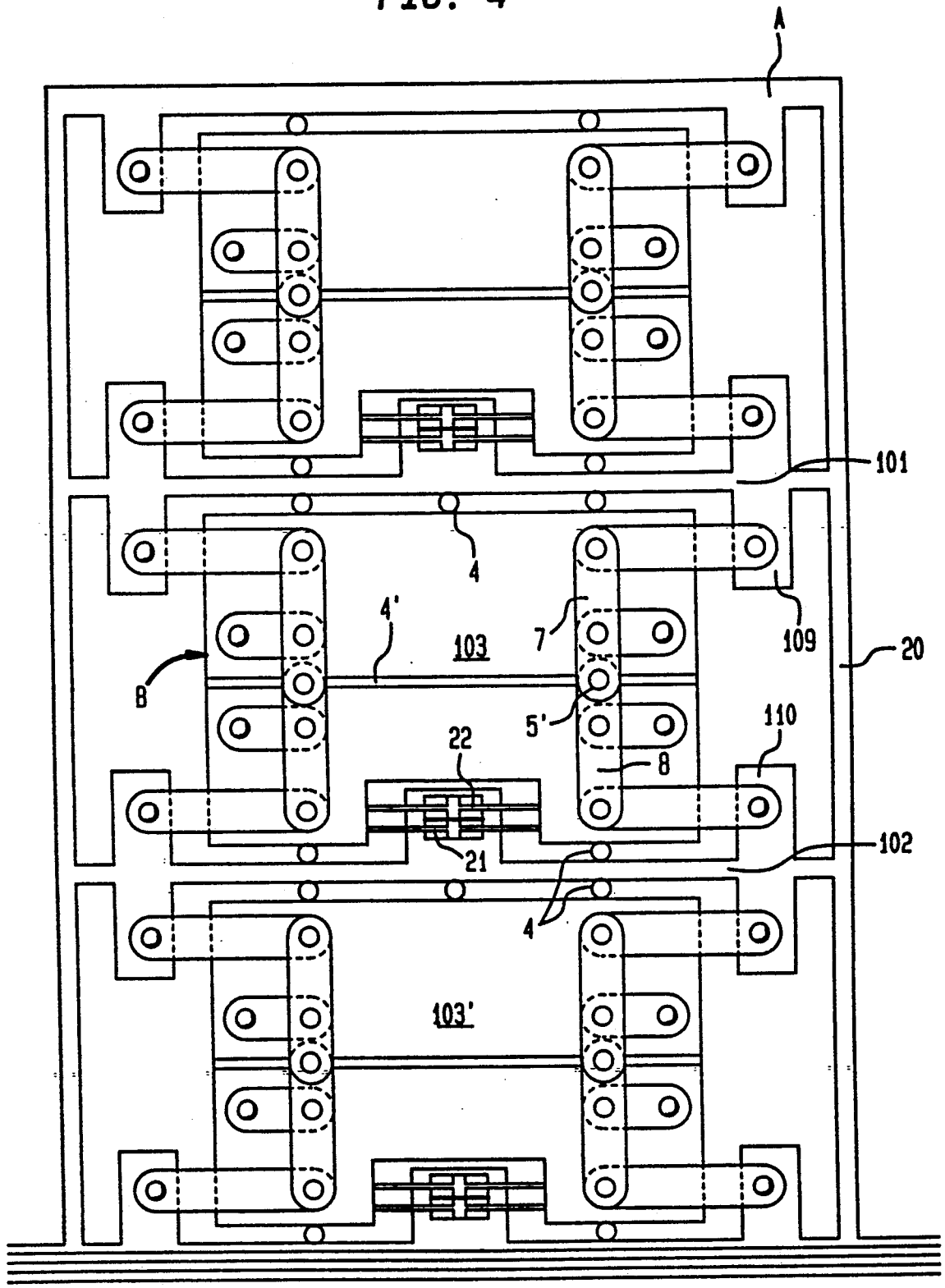
FIG. 4 shows a basic concept of a second structure having a vibration proofing or suppressing system provided in accordance with the present invention.
Figure 5:
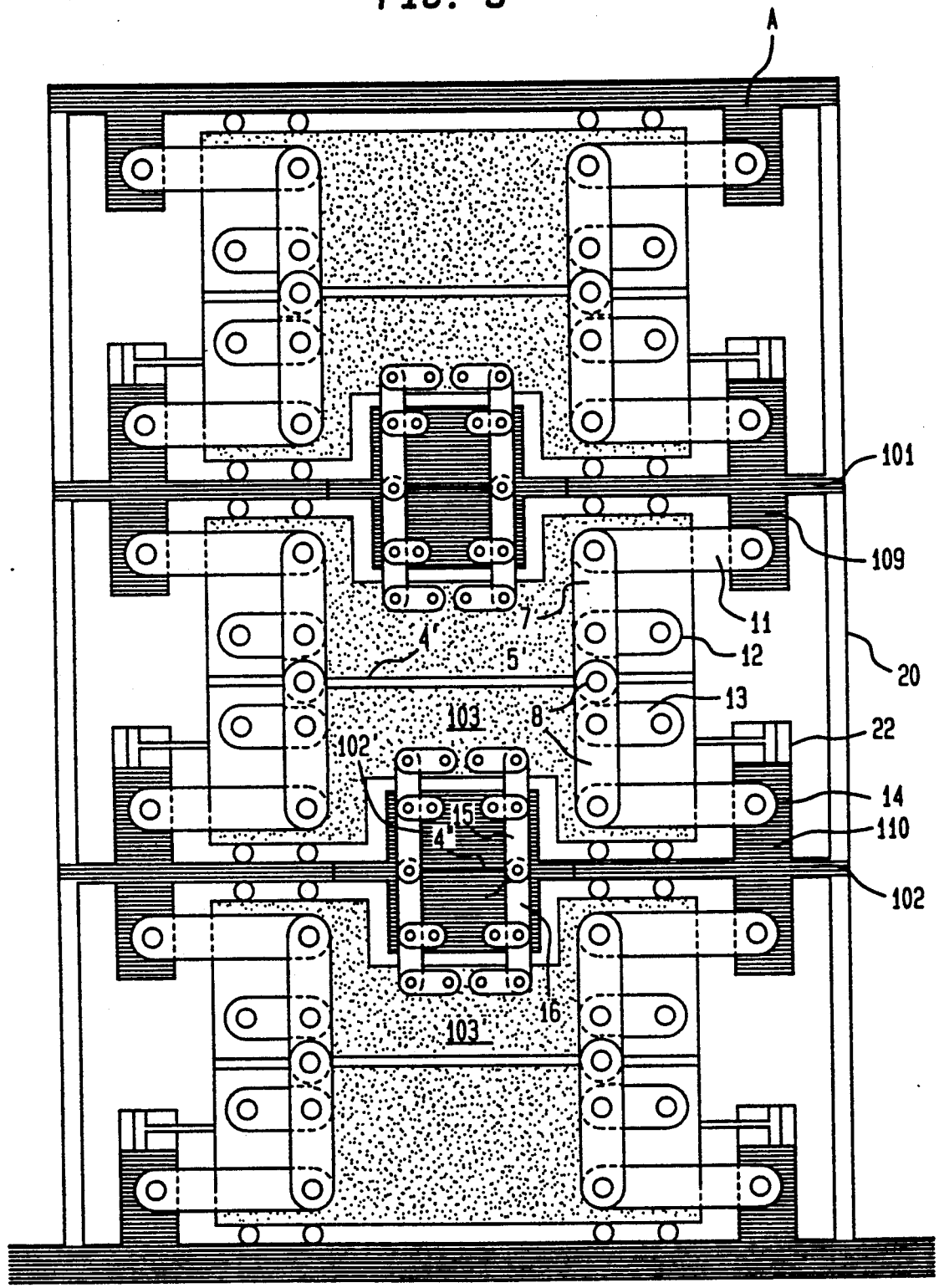
FIG. 5 shows the basic concept of a third structure having a vibration proofing or suppressing system provided in accordance with the present invention.

Through the utilization of the mechanical lever means shown in FIG. 4, FIG. 5 shows the basic concept of a second vibration proofing or suppressing mechanism provided in a structure in accordance wit the present invention. In the second vibration proofing or suppressing system for a structure, the structure is separated into two structures: one of them is a main structure A which is resistant to horizontal and vertical forces and moments and the other is a subsidiary structure B which can support vertical forces but has a low and/or insignificant resistance to horizontal forces. The mechanisms are provided in all the stories of the structure A or in all the stories except the uppermost one. In each mechanism, a floorboard of ceiling 101 and a floorboard 102 of each story of main structure A in which the mechanism is installed, are provided to correspond to the rigid members 1 and 2 discussed above in respect to FIGS. 1-3, and the mass of a simple weight or the subsidiary structure B is provided to correspond to the rigid members 3 and 5 and utilized as an auxiliary mass 103 or 105 (FIG. 7) to produce mass-effect. A frictional or viscous damper 21 and/or an actuator 22 are installed between the mass 103/105 of the mechanism (in at least anyone story of the main structure) and the floorboard 101 or 102 of the story or a solid portion 109 or a solid portion 110 (both of which are fixed to the floorboards 101 and 102, respective in the direction of suppression of vibration) in order to achieve the two following aims; that is, reducing the relative movement between the floorboards and controlling the motion of the auxiliary mass by a quantity desired by the designer of the system.

In the structure shown in FIG. 4, a simple weight is interposed as the auxiliary mass 103 together with a straight movement guide unit made of rollers 4, between the floorboard of ceiling 101 and floorboard 102 of any story of structure A, in which the mechanism is installed, is supported by pillars 20. The auxiliary masses 103 of any stories of main structure A are coupled to each other by the differential lever mechanisms shown in FIG. 3, so that the auxiliary masses can be swung. The viscous damper 21 and the control actuator 22 are provided between the floor 102 and auxiliary mass 103 of each or arbitrary stories of the main structure A to enhance the vibration suppressing effect of the vibration proofing or suppressing system.

Through the utilization the of mechanical lever means, FIG. 5 shows the basic concept of a third vibration proofing or suppressing system provided in a structure in accordance with the present invention. The floorboards 102 between the auxiliary masses 103 and 103' of all the pairs of the upper and lower stories of the main structure shown in FIG. 4 are coupled to each other by the differential double lever mechanisms shown in FIG. 3, to uniquely correlate the displacement ratios of the stories to each other. A straight guide 4" is secured to a solid portion 102' which is fixed to the floorboard 102 between the auxiliary masses 103 and 103'. The joint 5" of a third and a fourth lever means 15 and 16 is movable on the guide 4". Links couple the lever means 15 and 16 to a portion 102', which is fixed to the floor 102, and the auxiliary masses 103 and 103', in a swingable manner. As a result, the dependence of the story displacements on the floorboard of ceiling 101, the auxiliary mass 103, the floor 102, the auxiliary mass 103' and so forth is predetermined by the lever-ratios of the lever means. In other words, such coupling is provided for all the stories of the structure so that the distribution of displacements of all the stories can be uniquely predetermined under the condition that the rigidity of each lever means is infinitely high. If the rigidity of the lever means is not high enough, it can be compensated by the control actuator installed in the arbitrary story.

Figure 6:
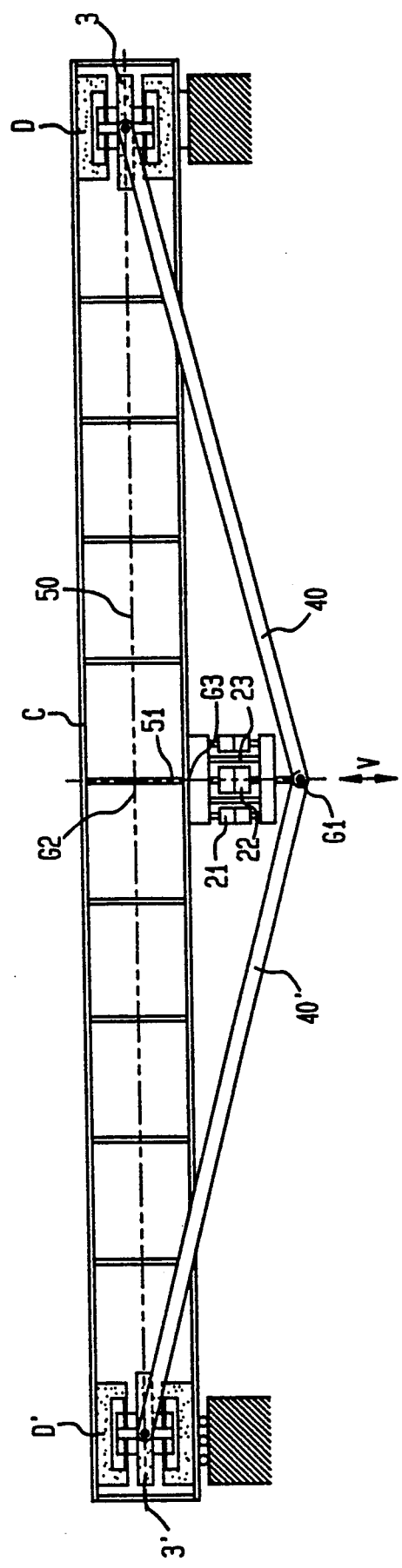
FIG. 6 shows a basic concept of a fourth structure having a vibration proofing or suppressing system provided in accordance with the present invention.

FIG. 6 shows the basic concept of a fourth vibration proofing or suppressing system provided in accordance with the present invention. That is, the differential double lever mechanisms D and D' are installed in structure C such as a bridge, a space frame or an observatory. The mechanism is installed at an arbitrary point of structure C, so that the rigid members 3 or 5 of the mechanism D act in response to the difference of the strains between (in the direction perpendicular to that to suppress the vibration, namely, the longitudinal direction of the structural member perpendicular to the direction of vibration V) of both sides thereof. One end of where the mechanism is installed in the structure chord member 40 is pivotally coupled to the member 3 or 5. One end of another chord member 40' is coupled to the rigid member 3' or 5' of the mechanism D' pivotally provided at another arbitrary point of the structural members for the structure C. The other ends of the chord members are pivotally coupled to each other at a point G1 which is located on an imaginary straight line 51 extending through the centers of the mechanisms or is located on the vertex of an imaginary triangle having a side which is located on the opposite vertex and coincident with the line. A point G of the structure C, which is located on an imaginary straight line 51 extending through the point G1 and a point G2 which is located on the line 50, is coupled to one end of a viscous damper 21, one end of a control actuator 22 and one end of a spring 23. The other ends of the damper, the actuator and the spring are coupled to the point G1.

The system is a kind of a toggle mechanism. Ropes may be used as the chord members 40 and 40'. If the point G1, G2 and G3 are an identical points on the imaginary straight line 50, the damper 21, the actuator 22 and the spring 23 are secured to these points of the structure C and the ends of the damper the actuator and the spring are coupled to point G1 of the chord member 40 and 40' (refer to FIG. 16).

OPERATION OF THE MECHANISM ACCORDING TO THE PRESENT INVENTION

When the rigid member 1 of each of the differential double lever mechanisms shown in FIGS. 1, 2 and 3 is forcibly disposed to the right by a displacement X1 under the condition that the movement of the rigid member 3 is constrained, the rigid member 5 or the joint 5' is displaced leftwards by $X5 = X1(r_2/r_1)$ relative to the rigid member 3 because the lever-ratio of the first lever means 7 is of the value $r_2/r_1$. Since the rigid member 3 is constrained, the rigid member 2 is accordingly displaced rightward by $X3 = X5(r_4/r_3) = X1(r_2/r_1)(r_4/r_3)$, because the lever ratio of the second lever means 8 is $r_4/r_3$. For these reasons, if calculations are made by using the position of the rigid member 2 as the origin of the coordinates, the leftward displacement of the rigid member 3 and that of the rigid member 5 or the joint 5' and the rightward relative displacement of the rigid member expressed in terms of the values X3 (X3+X5) and (X1−X3), respectively. Therefore, the lever-ratio of the leftward displacement of the rigid member 3, to the rightward relative displacement of the rigid member 1, is defined by the value:

$$X3/(X1-X3)=(r_2{}^*r_4)/(r_1{}^*r_3-r_2{}^*r_4),$$

and the lever-ratio of the leftward displacement of the rigid member 5, to the rightward relative displacement of the rigid member 1, is expressed by the value:

$$(X3+X5)/(X-X3)=((r_2{}^*r_4+r_2{}^*r_3)/(r_1{}^*r_3-r_2{}^*r_4)$$

any value of the lever-ratios can be consequently attained by predetermining those of the first and the second lever means 7 and 8, and be made very large by presetting the denominators of the above equations to be small. For that reason, if the mass of a simple weight or a subsidiary structure B, which can support a vertical force but is not highly resistant to a horizontal force, is used as an auxiliary mass between the stories of the main structure A so as to correspond to the rigid members 3 and 5, a considerablyhigh inertial force can be generated by the relatively large displacement of the auxiliary mass by the mass effect of the weight or the subsidiary structure, even if the auxiliary mass is made small and the relative displacement between the upper and lower stories of the main structure A is slight.

If the auxiliary masses of the upper and lower stories of the main structure A are coupled to the floorboards between them by the other differential double lever mechanism shown in FIG. 5 and such coupling occurs on all the stories of the structure in order to uniquely correlate the displacement ratios of all the stories, the mode of vibration of the structure can be approximately prescribed as intended by the designer thereof, to enhance the vibration suppressing effect of the vibration proofing or suppressing system.

Even if the relative displacement or strain between the rigid member 1 or the floorboard of ceiling 101 and the rigid member 2 or the floorboard 102 is small, a high damping force can be applied to the structure, because of the considerable displacements of the rigid members 3 and 5 or the auxiliary masses 103 and 105 and the frictional resistance between the rigid member 3 (the auxiliary mass 103) or the rigid member 5 (the auxiliary mass 105) and the rigid member 1 (the floorboard of ceiling 101) or the rigid member 2 (the floorboard 102) or between the rigid member 3 (the auxiliary mass 103) and the rigid member 5 (the auxiliary mass 105) or the viscous resistance of the viscous damper provided together with a toggle unit or the like between each above-mentioned parts or differential double lever mechanisms, to suppress the vibration of the integrated structure.

If the control actuator is installed in addition, the rigid member 3 or the auxiliary mass 105 can be driven, by quantities desired by the designer, to prevent the lever means from undergoing higher modes of vibration due to the insufficiency of the rigidity thereof. It is thus possible to enhance the reliability of the vibration proofing or suppressing system.

Further embodiments of the present invention are hereafter described with reference to the drawings.

Figure 7:
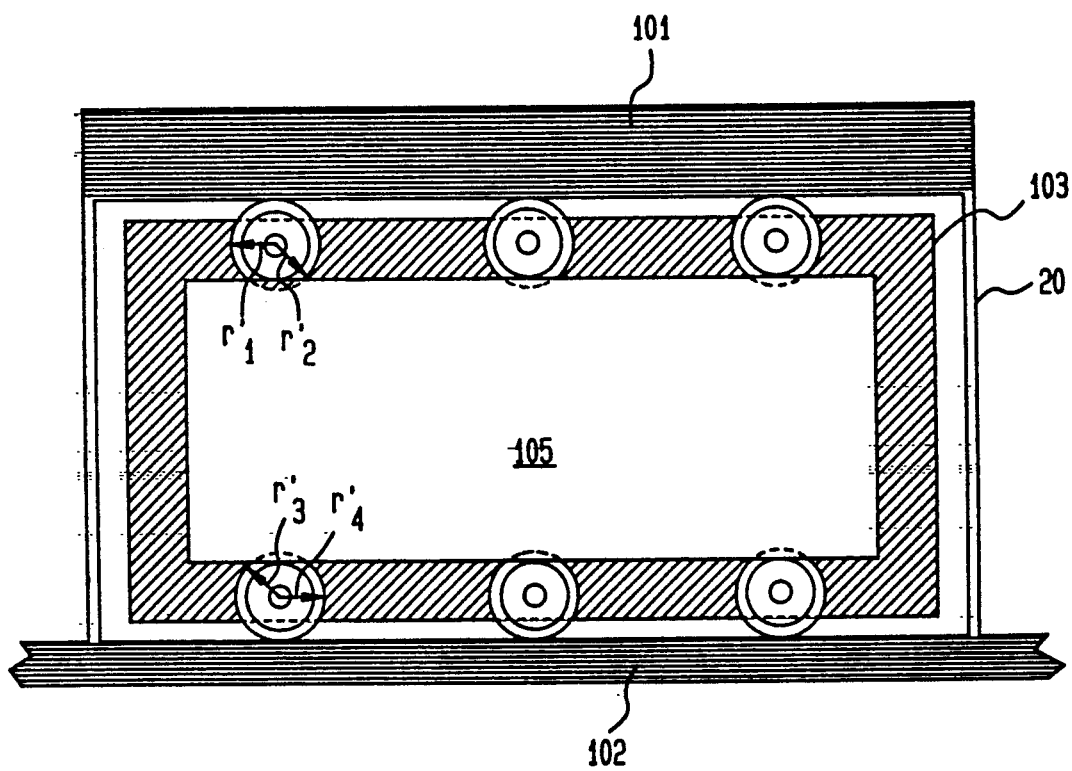
FIG. 7 shows a basic concept of a vibration proofing system having a differential double lever mechanism including friction wheels.

FIG. 7 shows a vibration proofing system having a differential double lever mechanism composed of friction wheels. The friction wheel with a radius of $r_1'$ and a friction wheel with a radius of $r_2'$ radius are supported by a shaft common to both the wheels at the top of auxiliary mass 103. The friction wheel with a radius of $r_3'$ and the friction wheel with a radius of $r_4'$ are supported by a shaft common to both wheels at the bottom of the auxiliary mass 103. The friction wheel is in contact with a floorboard of ceiling 101 supported by pillars 20. The friction wheel is in contact with a floor 102. An auxiliary mass 105 is interposed between the friction wheels of $r_2'$ and $r_3'$. When the auxiliary mass 103 is forcibly displaced to the left by X3, the lower friction wheel of $r_4'$ turned b angle $\Theta=X3/r_4'$ so that the other auxiliary mass 105 is move to the left by $X5=r_3'{}^*\Theta=(r_3'/r_4')X3$ more than the former auxiliary mass 103. At that time, the upper friction wheel of $r_1'$ is turned by an angle $\Theta'$ in the opposite direction to the lower friction wheel of $r_4'$, and the floorboard of ceiling 101 is moved to the right by $X1=\Theta'{}^*r_1'=(r_1'/r_2')X5=(r_1'{}^*r_3'/r_2'{}^*r_4')X3$ from the auxiliary mass 103, because there is a relationship of $r_2'{}^*\Theta'=X5$. For that reason, the lever-ratios of the means are $X3/(X1-X3)=(r_2'{}^*r_4')/(r_1'{}^*r_3'-r_2'{}^*r_4')$ and $(X3+X5)/(X1-X3)=(r_2'{}^*r_4'+r_2'{}^*r_3')/(r_1'{}^*r_3'-r_2'{}^*r_4')$. The friction wheels may be substituted by rack and pinion units.

Figure 8:
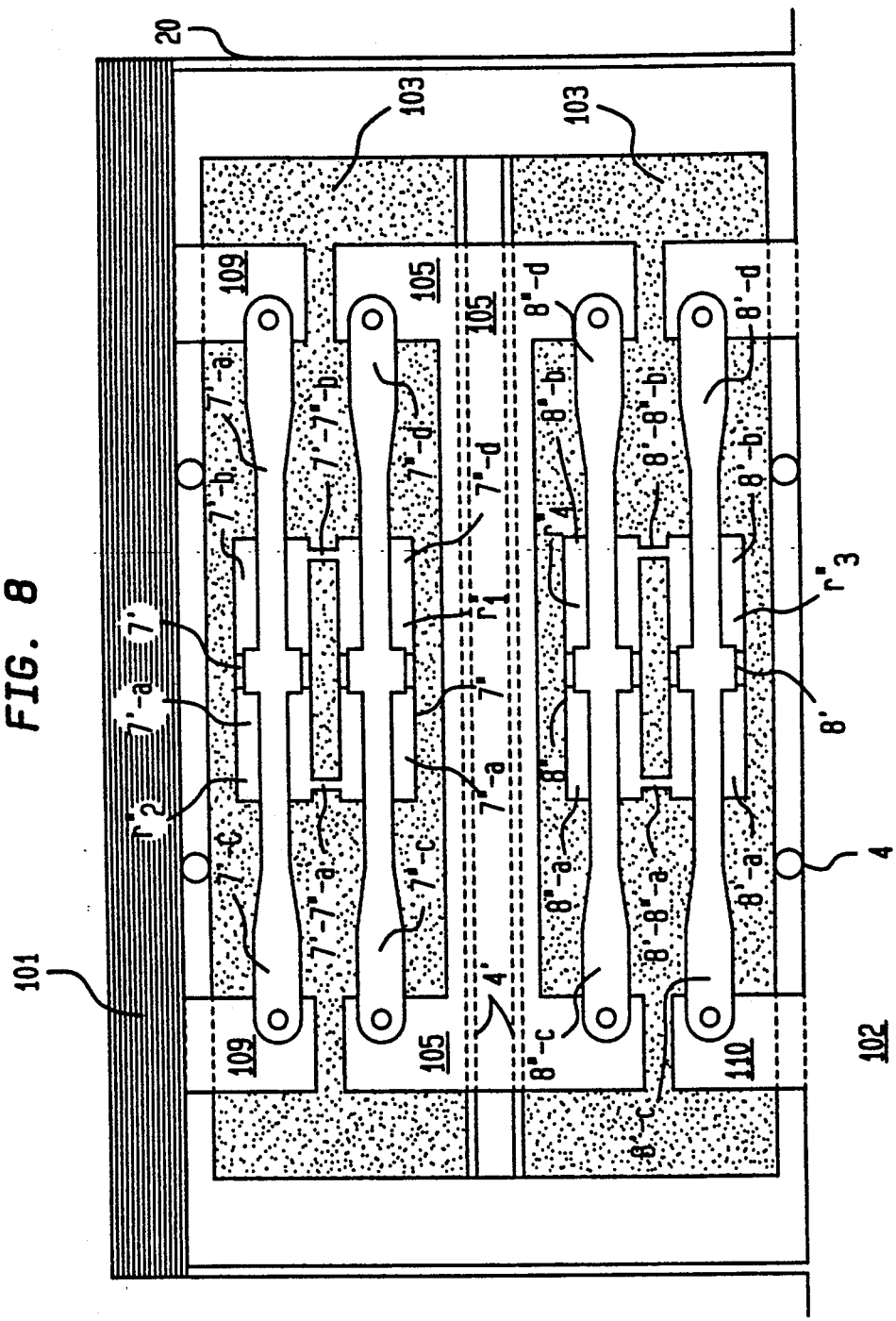
FIG. 8 shows a basic concept of a vibration proofing system having a differential double lever mechanism including fluid lever means.

FIG. 8 shows a vibration proofing system having a differential double lever mechanism composed of fluid lever means. A first double-acting cylinder unit 7' including cylinders 7'-a and 7'-b each having a cross-sectional area $r_2''$ is secured to an auxiliary mass 103. The rods 7'-c and 7'-d of the first doubleacting cylinder unit 7' are coupled to a floorboard of ceiling 101 or a solid portion 109 which is fixed to the floorboard of ceiling 101. A second double-acting cylinder 7'' unit including cylinders 7''-a and 7''-b each having a cross-sectional area $r_1''$ is secured to the auxiliary mass 103. The rods 7''-c and 7''-d of the second double-acting cylinder unit 7'' are coupled to an auxiliary mass 105. The cylinders 7'-a and 7''-a are connected to each other through a pipe 7'-7''-a. The cylinders 7'-b and 7''-b are connected to each other through a pipe 7'-7''-b. As a result, a fluid lever is formed.

A third double-acting cylinder unit 8'' including cylinders 8''-a and 8''-b each having a cross-sectional area $r_4''$ is secured to the auxiliary mass 103. The rods 8''-c and 8''-d of the third double-acting cylinder unit 8'' are coupled to the auxiliary mass 105. A fourth double-acting cylinder unit 8' including cylinders 8'-a and 8'-b each having a cross-sectional area $r_3''$ is secured to the auxiliary mass 103. The rods 8'-c and 8'-d of the fourth double-acting cylinder unit 8' are coupled to a floor 102 or a solid portion 110 which is fixed to the floor. The cylinders 8''-a and 8'-a are connected to each other through a pipe 8'-8''-a. The cylinders 8''-b and 8'-b are connected to each other through a pipe 8'-8''-b. As a result, the fluid lever means are formed.

The leftward displacement X3 of the auxiliary mass 103, the displacement X5 of the auxiliary mass 105 from the mass 103, and the rightward displacement X1 of the floorboard ,of the ceiling 101 from the auxiliary mass 103 have relationships of $X3{}^*r_3''=X5{}^*r_4''$ and $X5{}^*r_1''=X1{}^*r_2''$. For that reason, the lever-ratios of the lever means are $X3/(X1-X3)=(r_2''{}^*r_4'')/(r_1''{}^*r_3''-r_2''{}^*r_4'')$ and $(X3+X5)/(X1-X3)=(r_2''{}^*r_4''+r_2''r_3'')/(r_1''{}^*r_3''+r_2''{}^*r_4'')$. The double-acting cylinder units may be substituted by single-acting cylinder units each having a single rod.

FIG. 9 shows a vibration proofing system having a differential double fluid lever mechanism which is obtained by simplifying the mechanism of proofing system shown in FIG. 8. A third double-acting cylinder unit 8" including cylinders 8"-a and 8"-b each having a cross-sectional area $r_4''$ is secured to an auxiliary mass 103. The rods 8"-c and 8"-d of the third doubleacting cylinder unit 8" are coupled to a floorboard of ceiling 101 or a solid portion 109 which is fixed to the floorboard of ceiling 101. A second double-acting cylinder unit 7" including cylinders 7"-a and 7"-b each having a cross-sectional area $r_1''$ is secured to the auxiliary mass 103. The rods 7"-c and 7"-d of the second double-acting cylinder unit 7" are coupled to a floor 102 or a portion 110 which is fixed to the floor. The cylinders 8"-a and 7"-b are connected to each other through a pipe 8"-a-7"-b. The cylinders 8"-b and 7"-a are connected to each other through a pipe 8"-b-7"-a. As a result, a fluid lever is formed. The left displacement X3 of the auxiliary mass 103 and the right displacement X1 of the ceiling floorboard 101 from the auxiliary mass have a relationship of $r_4''*X1 = r_1''*X3$, and therefore have a relationship of $X3/(X1-X3) = r_4''/(r_1''-r_4'')$. This coincides with the case in which the cross-sectional areas $r_2''$ and $r_3''$ are mace equal to each other in the second embodiment.

Figure 11:
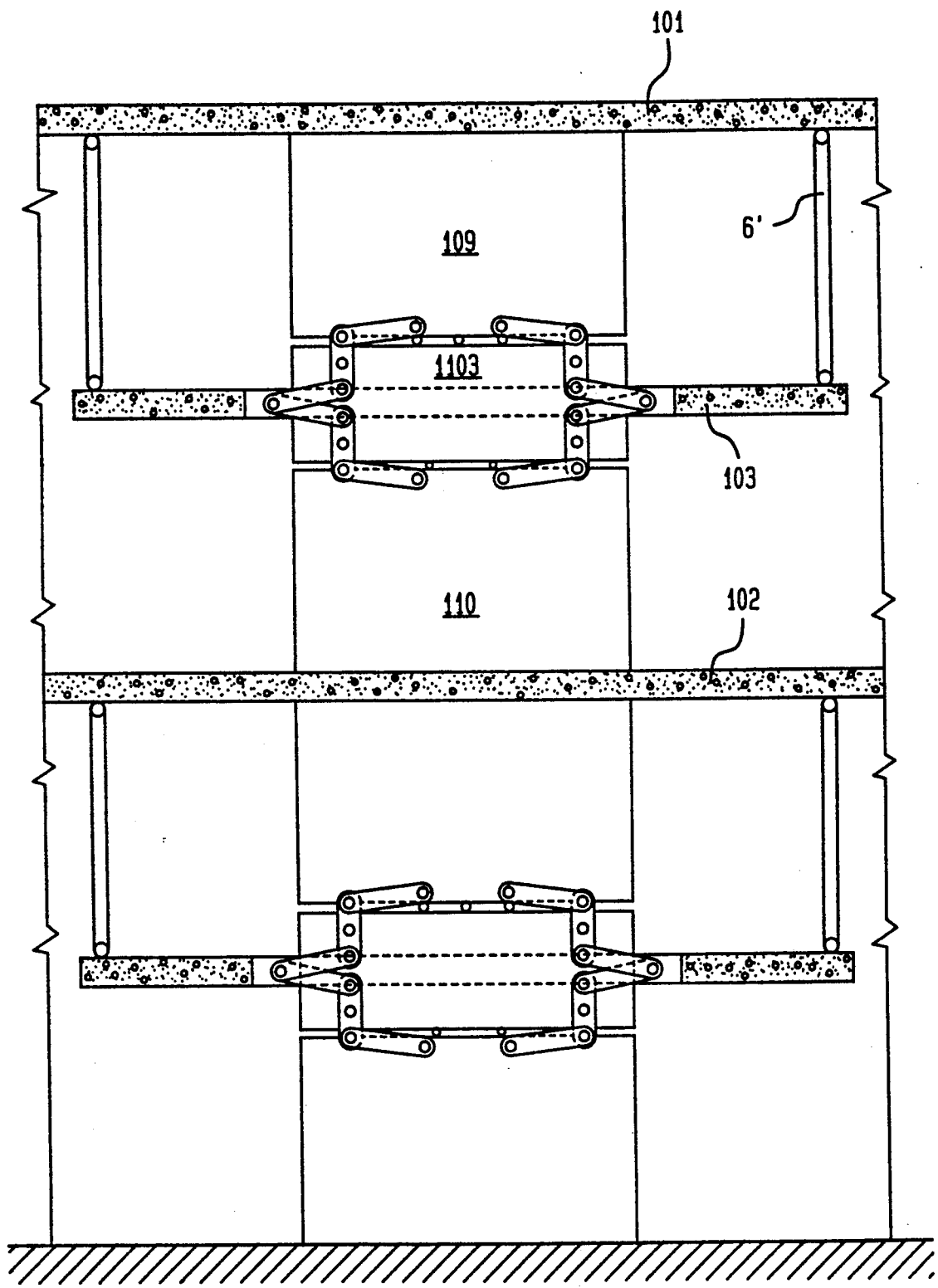
FIG. 11 is a sectional view of a vibration suppressing system for a multi-storied structure.

FIG. 10a is a plan view of each odd-numbered story of a multi-storied structure. The floors of the main portions A of the structure consist of the odd-numbered stories of the structure, that is, the floorboard of 101 and 102. FIG. 10b is a plan view of each even-numbered story of the multi-storied structure. The even-numbered stories of the structure are the subsidiary portions B of the structure, and are utilized as auxiliary masses 103. FIG. 11 is a sectional view of a vibration suppressing mechanism for the structure. The floors of odd-numbered stories, which are the floorboards 101 and 102 of the main structure A, are supported by pillars 20. The floor of each even-numbered story, which is the floorboard of the subsidiary portion B of the structure, is utilized as the auxiliary mass 103 and suspended with steel rods 6' from the floorboard 101 of the odd-numbered stories so as to serve as a parallel maintenance device to the floorboard of the main portion A under the effect of gravitation.

Figure 12:
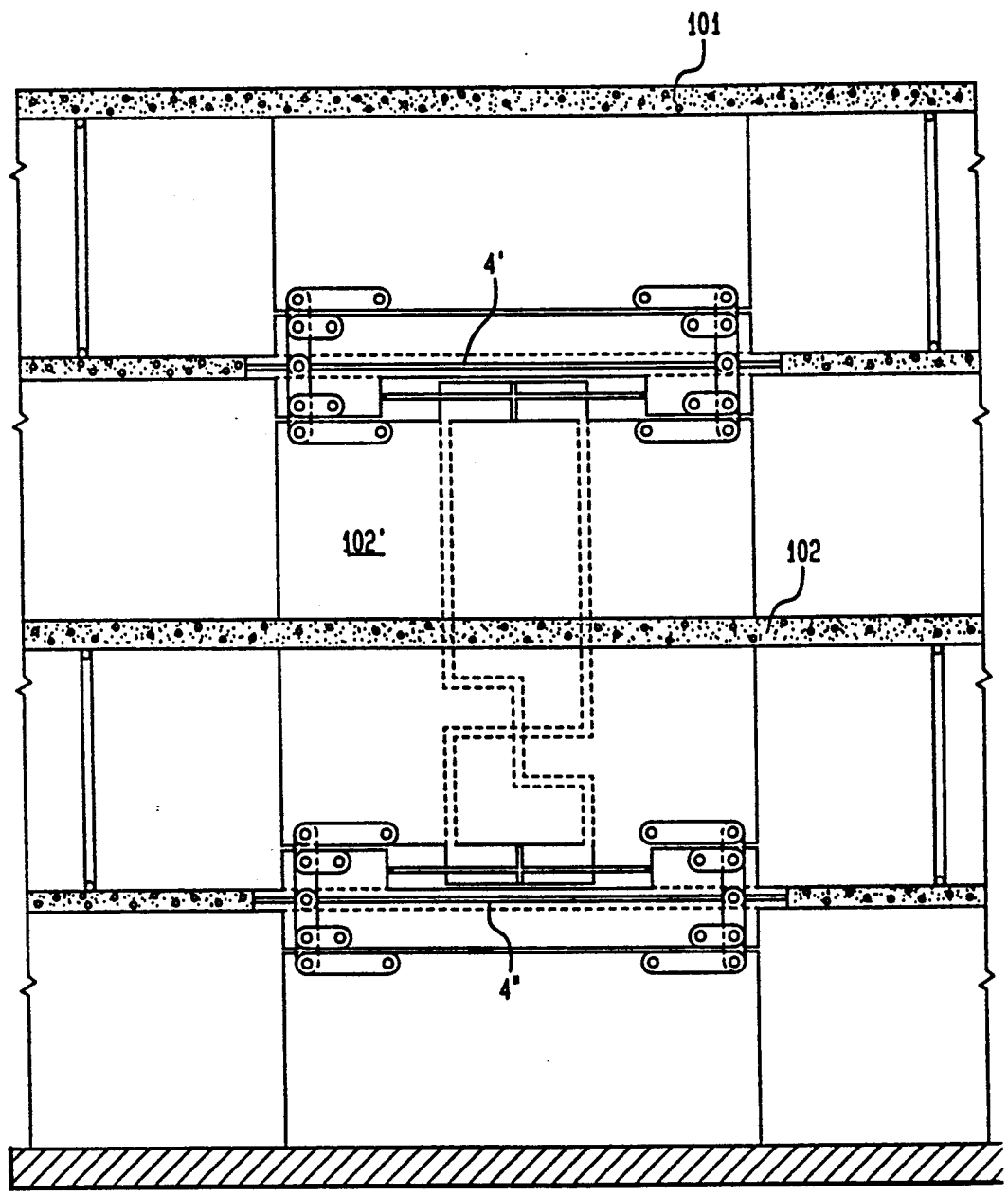
FIG. 12 shows a vibration proofing or suppressing system in which the three structural members of the system shown in FIG. 6 are coupled to each other by fluid differential double lever means.

FIG. 12 is a sectional view of a vibration suppressing system which is obtained by modifying the vibration suppressing system shown in FIG. 11, in such a manner that the three structural members, namely, the auxiliary masses and the floorboard of the main portion A between the auxiliary masses, are coupled to each other by the differential double fluid lever shown in FIG. 9. If a hydraulic pump is connected to the fluid lever means, it can be also used as a control actuator.

Figure 13:
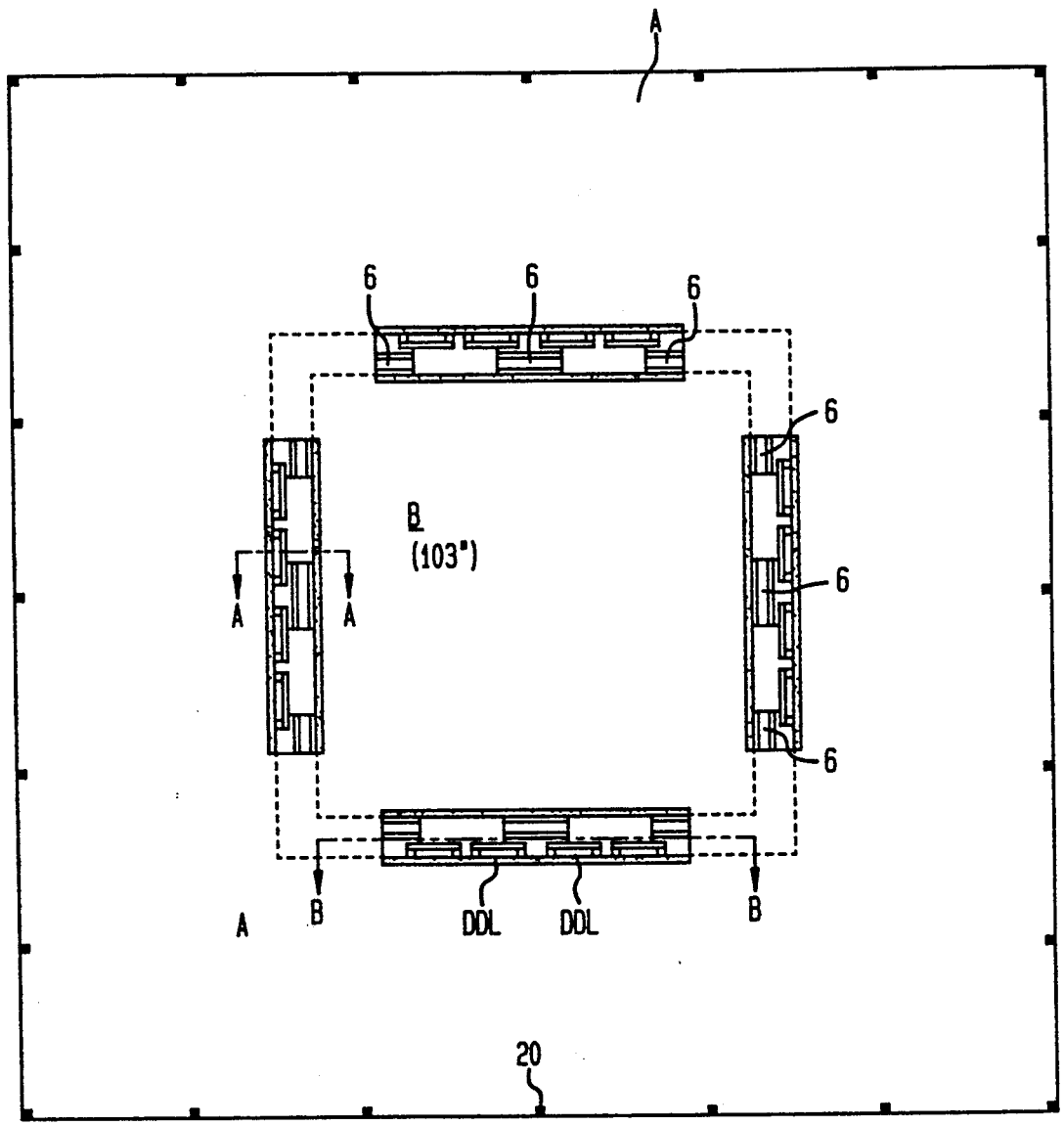
FIG. 13 is a sectional plan view of a multi-storied structure whose core is disposed as an subsidiary structure.
Figure 14:
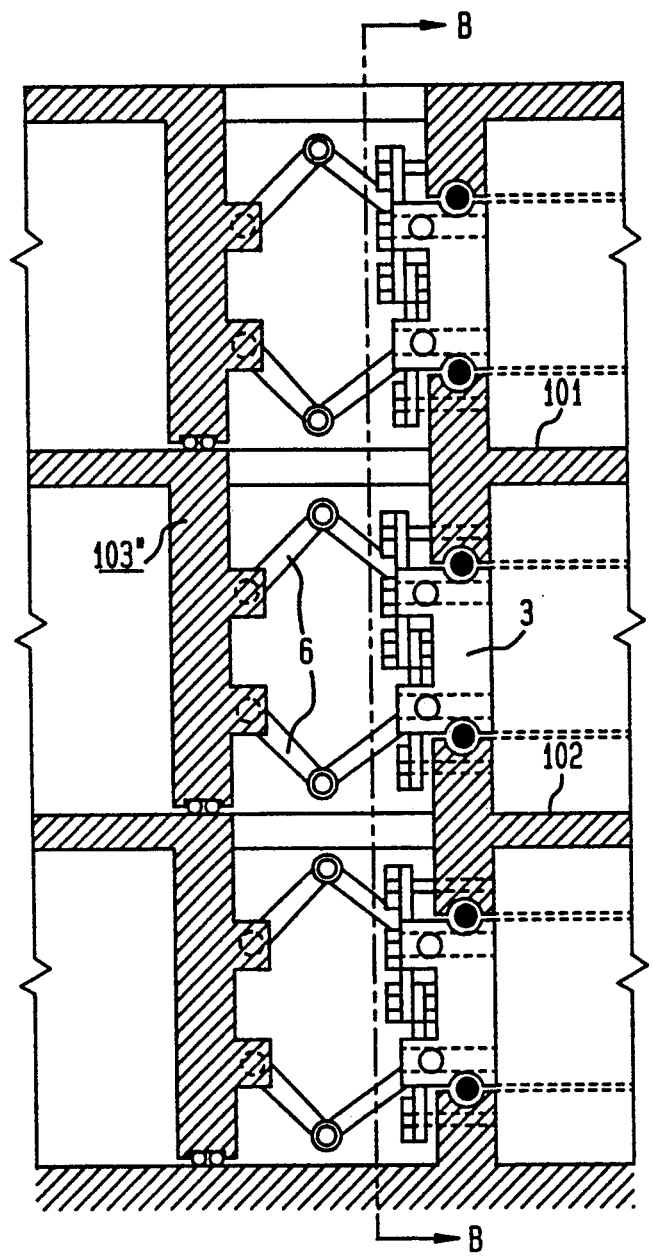
FIG. 14 is a longitudinal sectional view of a vibration suppressing system along a line A—A shown in FIG. 13.
Figure 15:
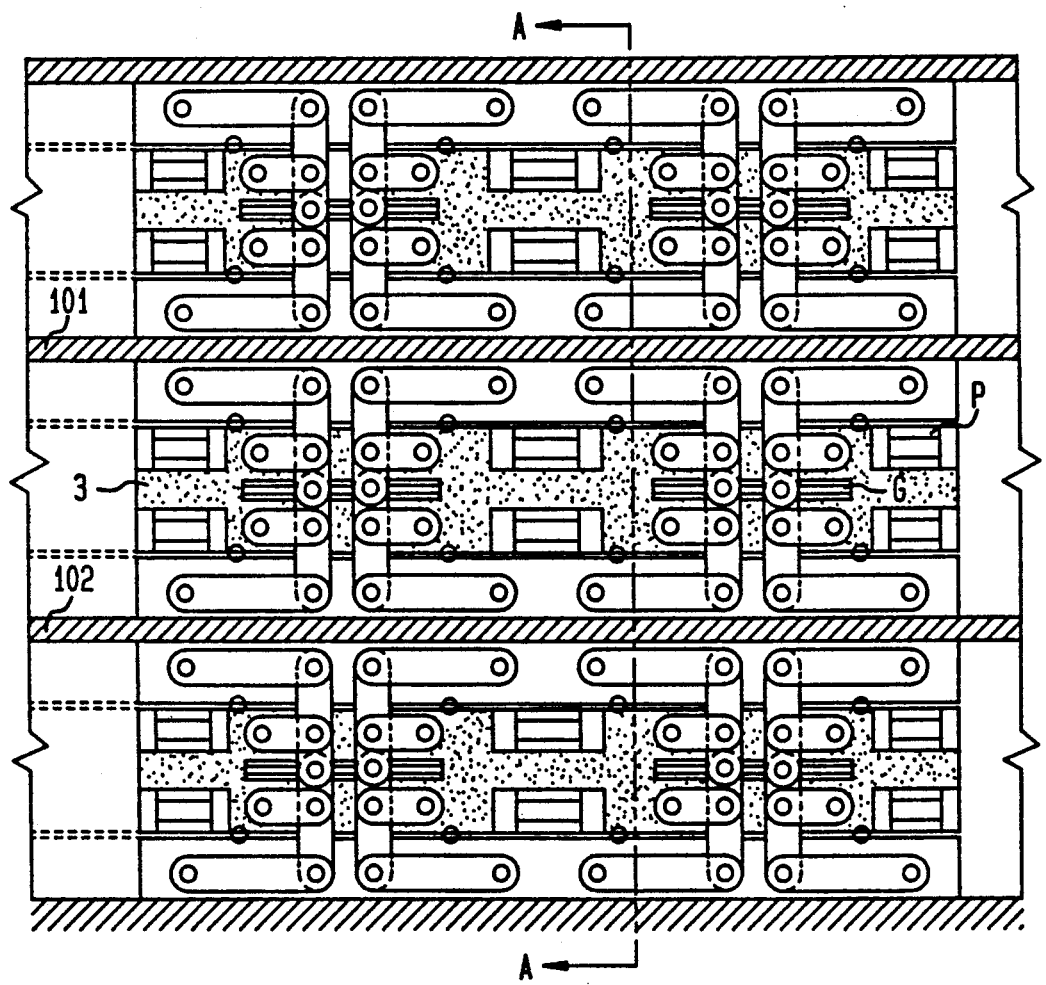
FIG. 15 is a longitudinal sectional view of the vibration suppressing system along a line B—B of FIG. 13.

FIG. 13 is a plan view of a multi-storied structure whose core is the subsidiary portion B of the structure and utilized as auxiliary masses 103". FIGS. 14 and 15 are sectional views vibration suppressing system for the structure shown in FIG. 13. The main and subsidiary portions A and B of the structure are separated from each other. A rigid member 3 is interposed between the floorboard of the ceiling 101 and floorboard 102 of each optional arbitrary story of the main portion A of the structure, and are coupled to each other by a differential double lever mechanism DDL. The walls of the auxiliary portion B are coupled to the rigid members 3 by pantograph means 6 made of rigid plates, so that the auxiliary masses 103" can be moved together with the rigid members in the directions of displacement thereof, and can be also moved perpendicularly in the directions of displacement. P shows the set position of the pantograph means 6 and G shows the straight guide.

Figure 16:
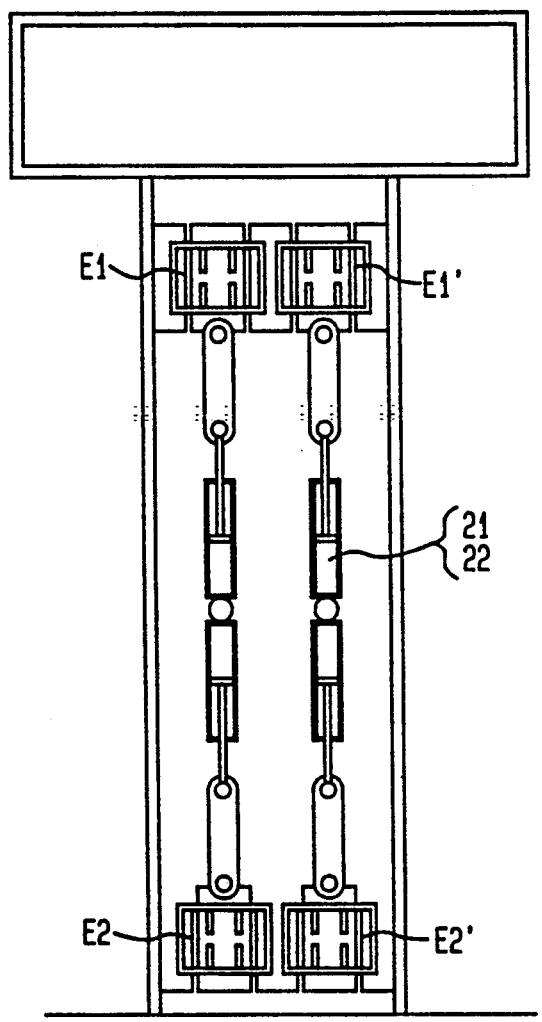
FIG. 16 shows a vibration suppressing system in which a plurality of differential double lever mechanisms are combined with an observatory.
Figure 17:
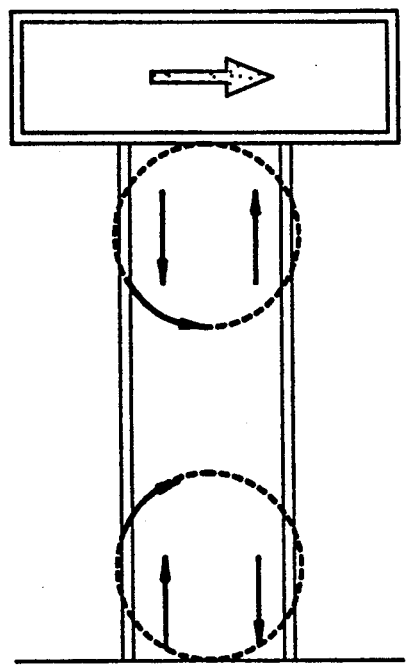
FIG. 17 is a view for describing the bending moment acting on to the observatory.
Figure 18A:
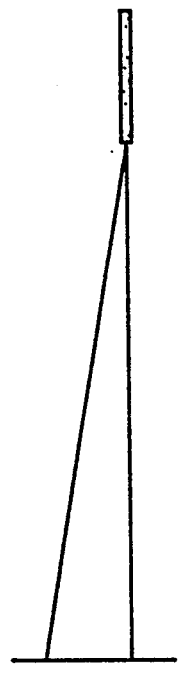
FIG. 18(a), 18(b), 18(c), 18(d) and 18(e) show various bending moments acting on to the observatory.
Figure 18B:
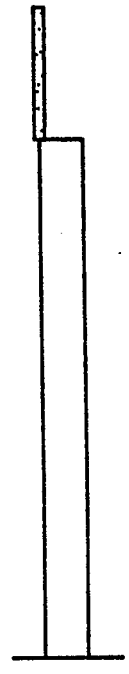
Figure 18C:
Figure 18D:
Figure 18E:
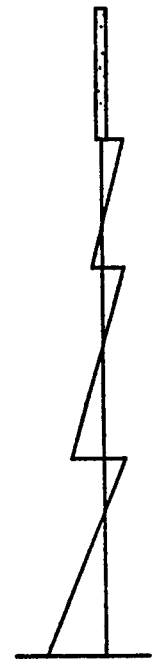

FIG. 16 is a sectional view of a structure in which a plurality of differential double lever mechanisms E1, E2, E1' and E2' are combined with an observatory 0 to apply a damping resistance to the bending moment. The lever mechanisms of E1, E2, E1' and E2' are secured to the top and bottom of the structure. The ends of viscous dampers 21 and control actuators 22 are coupled to each other between the lever mechanisms of E1 and E2 and between the other lever mechanisms of E1' and E2'. The other ends of the dampers 21 and the actuators 22 are coupled to the lever mechanisms of E1, E2, E1' and E2'. A couple of forces, which constitutes bending moment, can be applied to the structure, as shown in FIG. 17, by the combination of the lever-ratios of the lever mechanisms of E1, E1', E2 and E2' and the operation of the viscous dampers 21 and the control actuators 22. As a result, when the bending moment shown in FIG. 18(a) acts on the structure due to a disturbance in the case of non-control, the bending moment shown in FIG. 18(b), which is generated by the lever means, can be easily applied to the structure to cause the structure to receive the resultant bending moment shown in FIG. 18(c). If a plurality of such devices for applying bending moment for control are provided at plural stages, the bending moment shown in FIG. 18(d) can be applied to the structure to cause it to receive the resultant bending moment shown in FIG. 18(e). Besides, the effect of the viscous dampers can be amplified to produce a high vibrationsuppressing effect.

EFFECT OF THE PRESENT INVENTION

In a vibration proofing or suppressing system provided in accordance with the present invention and having a differential double lever mechanism, an auxiliary mass can be forcibly displaced many times by the relative displacement of a story whose vibration is to be suppressed, as long as a design that makes a small difference between the lever-ratios of the first and the second lever means is possible, even if the lever means are formed to have short arms and small lever-ratios in order to have a very high rigidity. For that reason, even if the relative deformation between the upper and lower stories of the main portion of a structure is small, a considerable inertial-force can be caused by the relatively large displacement of the auxiliary mass so as to suppress the vibration of the structure by the effect of the mass.

If the auxiliary masses of the upper and lower stories of the structure are coupled to the floorboards thereof between the auxiliary masses by another differential double lever mechanism with regard to all the stories of the structure, the displacement ratios of all the stories can be uniquely maintained as intended by the designer of the system, and hence it becomes possible to control the mode of the vibration of the structure with approximate accuracy by means of enhancing the vibration-suppressing effect of the system.

In another vibration proofing or suppressing system provided in accordance with the present invention, even if the relative displacement between the stories of a structure or the relative strain of the structure is small, a high damping force can be applied to the structure by the frictional resistance between an auxiliary mass and the floorboard of the structure or the viscous resistance of a viscous damper installed together with a toggle unit or the like, between the floorboards or two differential double lever mechanisms, because of the relatively large movement between rigid members interposed between differential double lever means.

In yet another vibration proofing or suppressing system provided in accordance with the present invention, a control actuator is installed so that auxiliary masses can be driven only by quantities desired by the designer of the system, to prevent lever means from undergoing higher modes of vibration due to the insufficiency of the rigidity thereof, and a controlling force for adjusting the frictional resistance to the displacement of the auxiliary masses and the decrease in an input such as an earthquake and the wind can be applied to the structure to enhance the reliability of the system.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is not for the purpose of limitation, but rather for the purpose of description not of limitation

What is claimed is:

1. A vibration proofing/suppressing system comprising:
    a first rigid member extending and translatable in a first direction;
    a second rigid member extending parallel to said first rigid member and translatable in the first direction relative to said first member;
    a third member interposed between said first and second rigid member;
    a fifth member interposed between said first and second rigid members;
    guide means interposed between said first, third and fifth members and said second, third and fifth members for guiding translation of said third and fifth members along the direction of relative movement between said first and second members;
    at lest one first lever means for connecting said first member to said fifth member, said one first lever means being pivotally connected to a first point on said third member such that said one first lever means is movable around the first point;
    at least one second lever means having a slightly different lever ratio than said one first lever means for connecting said second rigid member to said fifth member, said one second lever means being pivotally connected to a second point on said third member such that said one second lever means is movable around the second point.

2. The system according to claim 1, wherein said guide means comprises rollers disposed between said first and third members, between said first and fifth members, between said second and third members and between said second and fifth members.

3. The system according to claim 1, wherein said guide means comprises a pantograph unit disposed between said first and fifth members.

4. The system according to claim 1, wherein said fifth member comprises a rigid member.

5. The system according to claim 1, wherein said fifth member comprises a joint connecting said first lever means and said at least one second lever means.

6. A structure having a plurality of stories and including one of the vibration proofing/suppressing systems of claim 1, said structure comprising:
    a main structure which is adapted to resist horizontal and vertical forces and moments;
    a subsidiary structure which is adapted to support vertical forces but has little resistance to horizontal forces;
    wherein
    said system is installed in at least some of the stories in said structure;
    said first and second rigid members comprise a floorboard of a ceiling and a floorboard, respectively, of each story;
    said third and fifth members comprises said subsidiary structure utilized as an auxiliary mass to produce mass-effect;
    a damper and an actuator are installed between the auxiliary mass and the floorboard of the ceiling of the floorboard of the story for reducing the relative movement between the floorboards, and controlling inertia force due to the auxiliary mass by a predetermined quantity.

7. The structure according to claim 6, wherein the floorboards between the auxiliary masses of all pairs of upper and lower stories of the structure are connected to each other by said system for holding the ratio of displacement to a regular movement along a vertical axis of said structure.

8. A structure including at least one of the vibration proofing/suppressing systems of claim 1, that is a bridge, a space frame or an observatory, and being comprised of at least a first and second system, provided at any point of an any structural member of said structure, in such a manner that the third and fifth members of the first system act in response to the difference between the strains, in a longitudinal direction, of the structural members, of both sides of the member in question;
    a first chord member having a first end and a second end, said first end being pivotally coupled to the third or fifth member of the first system;
    a second chord member having a first end and a second end, said first end being pivotally coupled to the third or fifth member of the second system, the second end of the first chord member being pivotally coupled to the second end of the second chord member at a first point which is located on a first imaginary straight line extending through the centers of the systems; and
    a viscous damper, a control actuator and a spring, each having a first end coupled to a second point of the structure which is located on the imaginary straight line extending through said imaginary straight point and a second point located on the first line, and a second end coupled to the first point.

* * * * *